United States Patent [19]

Tano et al.

[11] 4,196,998

[45] Apr. 8, 1980

[54] CAMERA DISPLAY DEVICE IN VIEW FINDER

[75] Inventors: Eiichi Tano, Kami Fukuoka; Sinji Urata, Tachikawa, both of Japan

[73] Assignee: Asahi Kogaku Kogyo Kabushiki Kaisha, Tokyo, Japan

[21] Appl. No.: 954,677

[22] Filed: Oct. 25, 1978

[30] Foreign Application Priority Data

Oct. 25, 1977 [JP] Japan .................... 52-143033[U]

[51] Int. Cl.² ............................................. G03B 17/20
[52] U.S. Cl. ................................................... 354/289
[58] Field of Search ............... 354/289, 23 D, 53, 57, 354/60 E, 60 L

[56] References Cited

U.S. PATENT DOCUMENTS 4,114,173   9/1978   Tezuka et al. .................... 354/289 X

FOREIGN PATENT DOCUMENTS 1810377  10/1969  Fed. Rep. of Germany .......... 354/289

Primary Examiner—Michael L. Gellner
Attorney, Agent, or Firm—Sughrue, Rothwell, Mion, Zinn and Macpeak

[57] ABSTRACT

A display device in the view finder of a camera in which relevant photographing information is displayed digitally by display elements. A logical product of an electrical signal is generated by a switch operated when said camera is set for self-timer photographing or, when the camera is set for bulb photographing. This signal and an electrical signal provided upon start of photographing, are employed and the lighting of the display elements in the finder is stopped in synchronization with the start of self-timer photographing or with the start of bulb photographing.

9 Claims, 2 Drawing Figures

CAMERA DISPLAY DEVICE IN VIEW FINDER

BACKGROUND OF THE INVENTION

Heretofore, an ammeter has used as the instrument for displaying photographing information such as shutter speed or aperture opening in a camera. However, an ammeter is not generally strong enough to withstand mechanical vibration and is low in reliability. In addition, an ammeter occupies a relatively large space in the camera body. Furthermore, a tendency toward miniaturizing the size of a camera body is a prevalent design requirement among newer models.

In view of the foregoing, recently, solid light emission elements such as light emitting diodes (LEDs) have been employed as display means. These elements are rugged, and the circuitry employed can be made in IC form to satisfy design requirements. The use of LED's however, places serious power requirements of the camera battery since the power requirements are relatively high. This is especially true in the case of digital display using a series of LED segments to form a specific numerial value.

In general, in certain types of photography such as bulb or self-timer operation, the photographer rarely looks in the finder in the period of time from the start of photographing until the completion of the exposure. Therefore, during this interval illumination of the display elements may be stopped.

SUMMARY OF THE INVENTION

This invention has been developed to minimize power consumption in such camera systems. It provides a display circuit in which illumination of the display elements in the view finder is stopped at the start of photography only in bulb or self-timer modes of operation. As a result, economy of battery power results.

Accordingly, it is an object this invention to define a circuit responsive to various modes of operation of a camera to blank-out the display in the view finder when it is not needed.

It is another object of this invention to define a circuit that will minimize power consumption in a camera having an LED display.

These and other objects of the invention are accomplished by means of a circuit responsive to a logical product generated by two input signals. The first signal is generated in response to timer or bulb operation and the second is generated when the photography sequence begins, i.e. depression of the shutter. The output signal blanks-out the display in synchronism with the start of operation.

Preferred embodiments of this invention will be described with reference to the accompanying drawings.

DESCRIPTION OF THE PREFERRED EMBODIMENT

Figure 1:
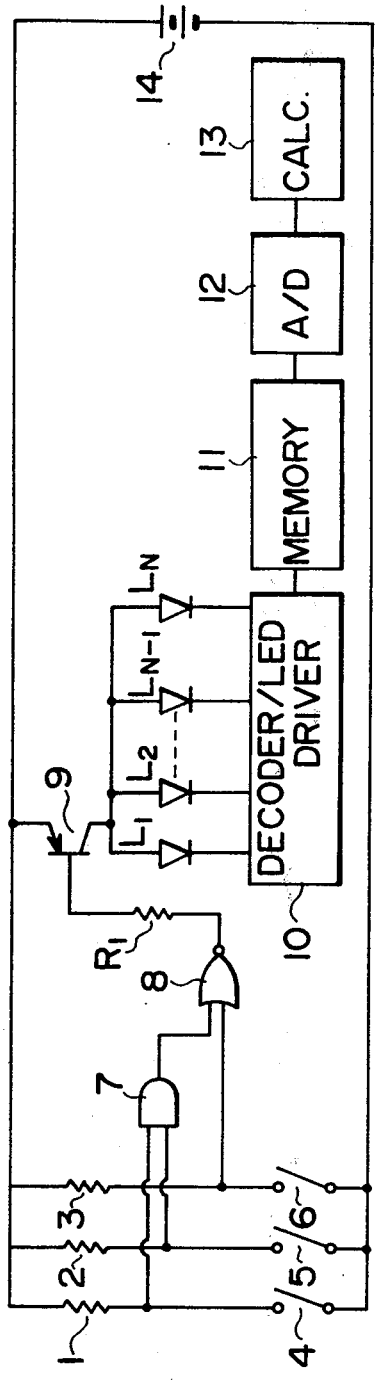
FIG. 1 is a circuit diagram, partly as a block diagram, showing a first embodiment of this invention in which the anodes of light emitting diodes are connected together.

Referring now to FIG. 1, resistors 1, 2 and 3 are connected together to the positive terminal of a battery 14, and the remaining terminals of the resistors are connected through switches 4, 5 and 6 to the negative terminal of the battery 14, respectively. Switch 4 is turned on when the camera is set for bulb photographing. Switch 5 is turned on when the camera is set for self-timer photographing. Switch 6 is operated in synchronization with the release operation of the camera; that is, it is turned on in synchronization with the start of opening the shutter in bulb photographing and with the start of operating the timer in self-timer photographing and is turned off upon completion of the exposure.

Logical signals provided by the on-off operations of the switches 4 and 5 are applied to an AND gate 7. The output of the AND gate 7 and a logical signal provided by the on-off operation of the switch 6 are applied to a NOR gate 8. The output of the NOR gate 8 is applied through a resistor $R_1$ of a PNP type transistor 9. As shown in FIG. 1, the emitter of the transistor 9 is connected to the positive terminal of the battery 14, and the collector thereof is connected to the common connection point of the anodes of light emitting diodes $L_1$ through $L_N$. The transistor accordingly acts as a switch depending on base current for switching functions. A calculating circuit 13 operates to calculate photography information of the camera, such as an object brightness, a film ASA sensitivity, a shutter speed, and an aperture value. An analog-to-digital (A/D) converter circuit 12 is connected to calculation circuit 13 for converting the calculation output of the calculating circuit 13 into digital data. Connected to the A/D converter 12 is a memory circuit 11 for storing the digital data generated by the A/C converter 12. A decoder/LED driver circuit 10 connected to the memory circuit 11 and to the light emitting diodes $L_1$ through $L_N$ operates to decode information from the memory circuit 11 thereby to drive the light emitting diodes $L_1$ through $L_N$. A specific implementation of this type of LED illumination system is founding co-pending application entitled "DISPLAY DEVICE IN CAMERA VIEW FINDER" and filed on the same data as this application.

In the circuitry shown in FIG. 1, when the camera is set for neither of bulb photographing and self-timer photographing, the switches 4 and 5 are in "off" state, and therefore the output of the AND gate 7 is at a logical level "1". Accordingly, the output of the NOR gate 8 is at a logical level "0" irrespective to the on-off operation of the switch 6. In the transistor 9 the base current flows through the resistor $R_1$. Hence, the transistor 9 is rendered conductive so that current is supplied to one or more of the light emitting diodes $L_1$ through $L_N$ according to the information from the decoder/LED driver circuit 10. As a result, these light emitting diodes are selectively driven to form and display the necessary data.

If the camera is set for bulb photographing or self-timer operation, then switch 4 or 5 is turned on. Therefore, the output of the AND gate 7 is at the level "0", and the NOR gate 8 is opened. When, under this condition, the switch 6 is turned on in response to the release operation of the camera, the nor gate 8 obtains the logical product of the output of the AND gate 7 and an electrical signal provided by turning on the switch 6, and the output of the NOR gate 8 is raised to the level "1". Accordingly, the base current of the transistor 9 is interrupted, and flow of collector current thereof is also interrupted. Thus, irrespective of the information received from the decoder/LED driver circuit 10, all of the light emitting diodes $L_1$ through $L_N$ are turned off. This is the case where as shown the light emitting diodes have anodes connected together.

Figure 2:
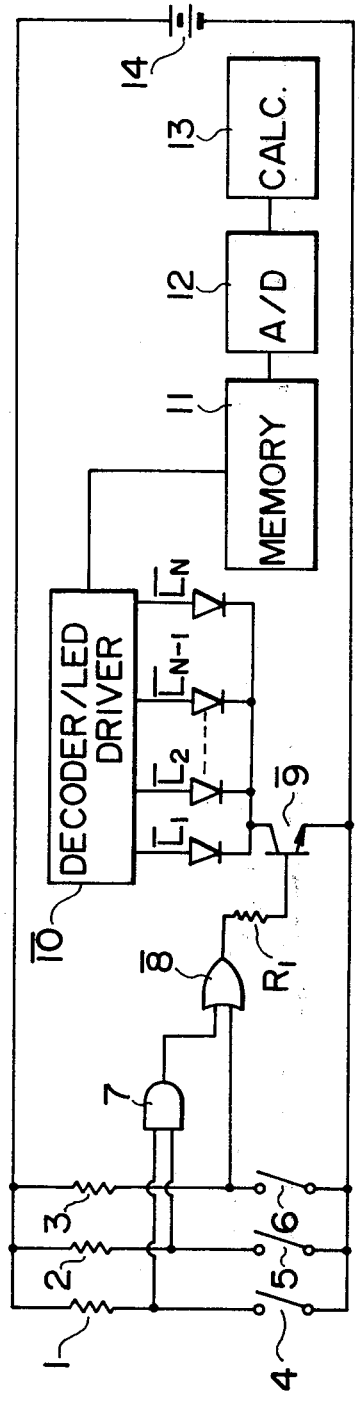
FIG. 2 is a circuit diagram, partly as a block diagram, showing a second embodiment of this invention in which the cathodes of light emitting diodes are connected together.

Shown in FIG. 2 is the converse situation there light emitting diodes have cathodes connected together and are driven in that manner. That is, in the circuitry shown in FIG. 2, an OR gate 8 is employed instead of the NOR gate 8 in FIG. 1, an NPN type transistor $\overline{9}$ is employed instead of the PNP type transistor 9. A decoder/LED driver circuit $\overline{10}$ generates an output such that the outputs of the decoder/LED driver circuit 10 in FIG. 1 are inverted. Similarly as in the case of FIG. 1, the light emitting diodes $\overline{L}_1$ through $\overline{L}_N$ can be turned off in synchronization with the start of self-timer photographing or the start of bulb photographing.

As is apparent from the above description, according to this invention, in the case where the photographer normally does not look in the finder as in the case of bulb photographing or self-timer photographing, lighting of the display elements in the finder is suspended for the period of time from the start of camera operation to the completion of exposure. This is accomplished using simple circuitry. Thus, the invention greatly contributes to the economical use of current consumed by the electronic circuit in the camera which is driven by the battery.

It is apparent that modifications of this invention are possible without departing from the essential scope of this invention.

What is claimed is:

1. In a display device for a camera wherein relevant photography data is displayed by electronic display elements powered by a battery, the improvement comprising: first switch means responsive to camera operation for generating a first output signal, second switch means responsive to the initiation of an exposure sequence to generate a second output signal, and means responsive to said first and second output signals to inhibit display by said electronic display elements, wherein said first switch means comprises a first switch responsive to actuation of a camera self-timer and a third switch responsive to a camera setting for bulb operation, said first and third switches and said second switch means each being coupled in series with a resistor to form switch-resistor pairs and each switch-resistor pair being coupled in parallel with each other.

2. The display device of claim 1 wherein said first switch means is responsive to actuation of a self-timer in the camera.

3. The display device of claim 1 wherein said first switch means is responsive to a camera setting for bulb photographing.

4. In a display device for a camera wherein relevant photography data is displayed by electronic display elements powered by a battery, the improvement comprising: first switch means responsive to camera operation for generating a first output signal, second switch means responsive to the initiation of an exposure sequence for generating a second output signal, and means responsive to said first and second output signals to inhibit display by said electronic display elements, wherein said means responsive to said first and second output signals comprises an AND gate receiving said first output signal and a NOR gate receiving the output of said AND gate and said second output signal.

5. The display device of claim 4 further comprising third switch means responsive to the output of said NOR gate to impede the current flow from said battery to said display elements.

6. The display device of claim 5 wherein said display elements are LED's having coupled anodes and said third switch means is a PNP transistor having its base coupled to said NOR gate and collector to said anodes.

7. In a display device for a camera wherein relevant photography data is displayed by electronic display elements powered by a battery, the improvement comprising: first switch means responsive to camera operation for generating a first output signal, second switch means responsive to the initiation of an exposure sequence for generating a second output signal, and means responsive to said first and second output signals to inhibit display by said electronic display elements, wherein said means responsive to said first and second output signals comprises an AND gate receiving said first output signal and an OR gate receiving the output of said AND gate and said second output signals.

8. The display device of claim 7 further comprising third switch means responsive to the output of said OR gate to impede the current flow from said battery to said display elements.

9. The display device of claim 8 wherein said display elements are LED's having their cathodes coupled and said third switch means is an NPN transistor having its base coupled to said OR gate and collector coupled to said cathodes.

* * * * *